3,231,610
PROCESS FOR THE PRODUCTION OF CARBODIIMIDES

Engelbert Kühle, Cologne-Stammheim, Germany, assignor to Farbenfabriken Bayer Aktiengesellschaft, Leverkusen, Germany, a corporation of Germany
No Drawing. Filed Oct. 24, 1962, Ser. No. 232,859
Claims priority, application Germany, Nov. 14, 1961, F 35,356
6 Claims. (Cl. 260—551)

This invention relates to carbodiimides and to a process for the production of symmetrical and unsymmetrical carbodiimides in which isocyanide dichlorides are employed as reactants.

Several methods are known to prepare carbodiimides. One method known to the art is the reaction of an isocyanat with a phosphor containing organic heterocyclic compound. By this method only symmetrical carbodiimides could be obtained and it is evident that a need exists for a method of obtaining especially unsymmetrical carbodiimides in a technically and commercially interesting scale.

It is an object of the present invention to provide a process for the production of carbodiimides, said process utilises simple starting materials and can also be easily carried out on a commercial scale. Yet another object is to provide symmetrical and unsymmetrical carbodiimides. Other objects will be apparent from the following description and from the examples.

Broadly speaking, the objects of this invention are accomplished by reacting an organic isocyanide dichloride with a hydrochloric acid salt of a primary amine at an elevated temperature. The carbodiimide compounds which are prepared according to this process and which are the subject of the present invention are compounds having the general formulae $$R_1-N=C=N-R$$

or $$R_1-N=C=N-R-N=C=N-R_1$$

wherein R is an alkyl, an alkalylene, phenyl, phenylene, cyclohexyl, cyclohexylene, a chlorophenyl, a chlorophenylene, a nitrophenyl, a nitrophenylene, benzyl, benzylene, diphenyl, diphenylene, a naphthyl and a naphthylene group and $R_1$ stands for an alkyl, a cycloalkyl, an aryl, an alkoxyaryl, a chloroaryl and a nitroaryl group.

One decided advantage obtained by utilizing the process of this invention is that the groups of the carbodiimides can be selectively deposed in the reactants. The reaction of the organic isocyanide dichloride with the hydrochloric salt of a primary amine may be chemically represented as an example when R and R' are organic groups as follows:

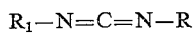

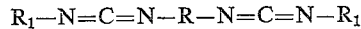

Bis-carbodiimides may be prepared by reacting either a bis-isocyanide dichloride with the hydrochloric salt of a primary monoamine or an isocyanide dichloride with the hydrochloric salt of a primary diamine. These reactions may be chemically represented as follows:

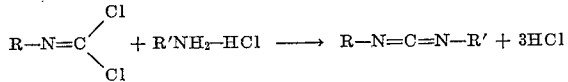

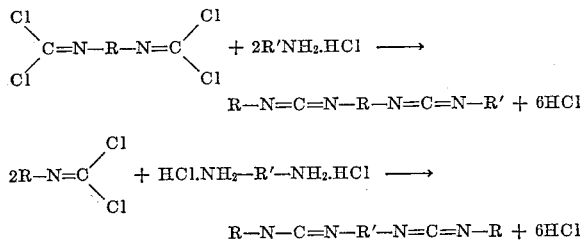

Polycarbodiimides are obtained from bis-isocyanide dihalides and salts of diamines. As mentioned above the process according to the present invention has the additional advantage that it is possible thereby to prepare unsymmetrical carbodiimides.

The reactants employed in the process according to the present invention may be aliphatic, cycloaliphatic or aromatic. Preferred halides are the dichlorides of the organic isocyanides.

Examples of suitable isocyanide dichlorides are n-butyl isocyanide dichloride, cyclohexyl-isocyanide dichloride, phenyl-isocyanide dichloride, tolyl-isocyanide dichloride, 4-chlorophenyl-isocyanide dichloride, 2,4-dichlorophenyl-isocyanide dichloride, 2,4,6-trichloro-phenyl-isocyanide dichloride, 2-nitrophenyl-, naphthyl-isocyanide dichloride, 4-isocyanide-dichloridobenzoyl-chloride, 1,4-phenylene-bis-isocyanide dichloride, benzyl-isocyanide dichloride, methoxy-nitrophenyl-isocyanide dichloride, benzophene-isocyanide dichloride and diphenylether-isocyanide dichloride.

As salts of primary amines, there may be employed the hydrochlorides of tert.-butylamine, cyclohexylamine, aniline, the toluidines, the chlorinated and nitrated anilines of aminodiphenyl, naphthylamine and the phenylene diamines.

Furthermore, hexamethylen diamine dihydrochloride, methylamine hydrochloride, cyclopentylamine hydrochloride, benzylamine hydrochloride can be used. The reaction is preferably carried out in an inert organic solvent of relatively high boiling point, such as chlorinated benzenes, nitrobenzene, dimethyl acetamide or tetramethylene sulfone. Preferred reaction temperatures are from 100° to 200° C.

In the above process various organic solvents may be used for carrying out the reaction such as aliphatic, cycloaliphatic and aromatic hydrocarbons. It is preferred to use high boiling halogenated hydrocarbons such as o-dichlorobenzene, p-chloro-bromo-benzene, 1-chloronaphthalene and halogenated xylenes.

The reaction products can be isolated in the usual manner, for example, by distillation or crystallization. The carbodiimides can be used as intermediates in organic synthesis reactions. Furthermore, these compounds may be used as catalyst in polymerizing technique and as stabilizers for synthetic resins. They are particularly useful as insecticides and herbicides.

In order that the invention may be more clearly understood the following examples are given by way of illustration only.

Example 1

39 grams of aniline hydrochloride and 56 grams of phenylisocyanide dichloride are heated at 180° C. for 18 hours in 400 ml. of o-dichlorobenzene, while passing through nitrogen. Hydrogen chloride is continuously evolved. The solvent is distilled off and the residual reaction mixture is subjected to vacuum distillation. 37 grams of diphenyl carbodiimide are obtained. The product has a boiling point at 0.1 mm. Hg of 112–118° C. (4-chlorophenyl)-phenylcarbodiimide having a boiling point of 139–141° C. at 0.08 mm. Hg can be prepared in a similar manner from 4-chlorophenyl isocyanide dichloride and aniline hydrochloride.

Example 2

33 grams of 4-chloroaniline hydrochloride and 52.7 grams of 2,4,6-trichlorophenyl-isocyanide dichloride are heated at 180° C. for 24 hours in 400 ml. of o-dichlorobenzene. The solvent is then distilled off in vacuo. A crystalline residue is thus obtained, from which 37 grams of (2,4,6-trichlorophenyl)-(4-chlorophenyl)-carbodiimide can be isolated by treatment with benzine. The product has a melting point of 116° C.

Example 3

43.7 grams of 4-nitraniline hydrochloride and 49 grams of phenyl isocyanide dichloride are heated at boiling point for 24 hours in 500 ml. of o-dichlorobenzene, the crystalline mass gradually dissolving. The substance is filtered off cold from a small quantity of insoluble substance. The solution is then concentrated in vacuo. A dark oil is obtained which crystallises on adding petroleum ether. The yield of (4-nitrophenyl)-phenylcarbodiimide (M.P. 63 to 66° C.) is 53 grams.

I claim:

1. A process for the production of carbodiimide compounds selected from compounds having the formulae $$R_1-N=C=N-R$$

and $$R_1-N=C=N-R-N=C=N-R_1$$

wherein R is a member selected from the group consisting of alkyl, alkylene, phenyl, phenylene, cyclohexyl, cyclohexylene, chlorophenyl, chlorophenylene, nitrophenyl, nitrophenylene, alkoxyphenyl, alkoxyphenylene, benzyl, benzylene, diphenyl, diphenylene, naphthyl and naphthylene, and $R_1$ is a member selected from the group consisting of alkyl, cycloalkyl, aryl, alkoxyaryl, chloroaryl and nitroaryl, which comprises reacting a compound of the formula $$R_1-N=C\begin{matrix}Cl\\ \\Cl\end{matrix}$$

with a hydrochloride salt of a primary amine which is a member of the group of amines having the formulae $R-NH_2$ and $NH_2-R-NH_2$ at a temperature of from 100 to 200° C. and in a high boiling inert organic solvent.

2. A process according to claim 1 wherein said solvent is a member selected from the group consisting of xylene, chlorobenzene and nitrobenzene.

3. A process according to claim 1 wherein said organic solvent is o-dichlorobenzene.

4. A process of preparing diphenyl carbodiimide which comprises reacting aniline hydrochloride and phenyl isocyanide dichloride at a temperature of 180° C. in the presence of o-dichlorobenzene as solvent.

5. A process of preparing 2,4,6-trichlorophenyl-4-chlorophenyl carbodiimide which comprises reacting 4-chloroaniline hydrochloride with 2,4,6-trichlorophenyl-isocyanide dichloride at a temperature of 180° C. in the presence of o-dichlorobenzene as solvent.

6. A process of preparing 4-nitrophenyl-phenyl carbodiimide which comprises reacting 4-nitroaniline hydrochloride with phenylisocyanide dichloride at boiling temperatures in the presence of o-dichlorobenzene as solvent.

References Cited by the Examiner

UNITED STATES PATENTS

| | | | |
|---|---|---|---|
| 2,853,473 | 9/1958 | Campbell et al. | 260—551 |
| 2,942,025 | 6/1960 | Coles et al. | 260—551 |
| 3,056,835 | 10/1962 | Managle et al. | 260—551 |

OTHER REFERENCES

Bergmann: The Chemistry of Acetylene and Related Compounds, page 80 (1948).

WALTER A. MODANCE, *Primary Examiner.*

IRVING MARCUS, *Examiner.*